US008824589B2

(12) United States Patent
Zhao

(10) Patent No.: US 8,824,589 B2
(45) Date of Patent: *Sep. 2, 2014

(54) METHOD, APPARATUS, AND SYSTEM FOR MICROWAVE SIGNAL CORRECTION

(75) Inventor: Guixue Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 12/984,705

(22) Filed: Jan. 5, 2011

(65) Prior Publication Data

US 2011/0110472 A1 May 12, 2011

Related U.S. Application Data

(63) Continuation of application No. PCT/CN2009/074869, filed on Nov. 9, 2009.

(51) Int. Cl.
*H04L 27/18* (2006.01)

(52) U.S. Cl.
USPC .......................................... 375/279; 375/358

(58) Field of Classification Search
USPC .................. 375/295–298, 278–279, 284–285
See application file for complete search history.

(56) References Cited

U.S. PATENT DOCUMENTS

| 5,867,065 | A  | * | 2/1999 | Leyendecker | 330/149 |
| 6,313,703 | B1 | * | 11/2001 | Wright et al. | 330/149 |
| 6,330,290 | B1 | | 12/2001 | Glas | |
| 6,614,854 | B1 | | 9/2003 | Chow | |
| 6,804,309 | B1 | * | 10/2004 | Morelos-Zaragoza | 375/316 |
| 6,898,252 | B1 | | 5/2005 | Yellin | |
| 7,076,217 | B1 | * | 7/2006 | Luff et al. | 455/84 |
| 7,388,926 | B2 | * | 6/2008 | Ishikawa et al. | 375/285 |
| 7,515,650 | B1 | * | 4/2009 | Warner et al. | 375/302 |
| 7,567,611 | B2 | * | 7/2009 | Chien | 375/219 |
| 7,818,028 | B2 | * | 10/2010 | Vassiliou et al. | 455/550.1 |
| 7,995,645 | B2 | * | 8/2011 | Lee et al. | 375/224 |
| 8,018,990 | B2 | * | 9/2011 | Lee et al. | 375/226 |
| 8,023,588 | B1 | * | 9/2011 | Benson et al. | 375/297 |
| 8,229,028 | B2 | * | 7/2012 | Lee et al. | 375/297 |
| 8,295,845 | B1 | * | 10/2012 | Abdollahi-Alibeik et al. | 455/445 |

(Continued)

FOREIGN PATENT DOCUMENTS

| CN | 101272373 A | 9/2008 |
| CN | 101499982 A | 8/2009 |
| RU | 2007132195 A | 3/2009 |
| WO | WO 2009/082457 A1 | 7/2009 |

OTHER PUBLICATIONS

Office action of related U.S. Appl. No. 13/250,278, mailed on Nov. 3, 2011, 32 pages total.

(Continued)

*Primary Examiner* — Emmanuel Bayard
(74) *Attorney, Agent, or Firm* — Brinks Gilson & Lione

(57) ABSTRACT

A method, an apparatus, and a system are provided in various embodiments of the present invention. According to embodiments of the present invention, the receiver samples the frequency signal from the transmitter to obtain sampling data and obtain the feedback IQ signal from the sampling data, and performs signal correction by using the feedback IQ signal. Sampling the received radio frequency signal does not need an additional component. The receiving channel installed in the receiver can be used to receive the radio frequency signal, which reduces the cost and power consumption.

13 Claims, 20 Drawing Sheets

(56) References Cited

U.S. PATENT DOCUMENTS

| | | | |
|---|---|---|---|
| 8,407,545 B2* | 3/2013 | Kubota | 714/746 |
| 2002/0015450 A1* | 2/2002 | Ratto | 375/261 |
| 2002/0186761 A1* | 12/2002 | Corbaton et al. | 375/231 |
| 2002/0196864 A1* | 12/2002 | Booth et al. | 375/296 |
| 2004/0152436 A1 | 8/2004 | Masenten et al. | |
| 2005/0128953 A1 | 6/2005 | Wallace et al. | |
| 2006/0034356 A1 | 2/2006 | Fechtel | |
| 2006/0121933 A1* | 6/2006 | Ikeda | 455/550.1 |
| 2006/0240786 A1* | 10/2006 | Liu | 455/114.3 |
| 2006/0274821 A1* | 12/2006 | Chen et al. | 375/149 |
| 2007/0080835 A1 | 4/2007 | Maeda et al. | |
| 2007/0183548 A1* | 8/2007 | Kanazashi | 375/368 |
| 2008/0026708 A1* | 1/2008 | Marsili et al. | 455/118 |
| 2008/0159418 A1* | 7/2008 | Anderson et al. | 375/260 |
| 2008/0159442 A1* | 7/2008 | Tanabe et al. | 375/324 |
| 2008/0160933 A1* | 7/2008 | Anderson et al. | 455/110 |
| 2009/0028231 A1* | 1/2009 | Lee et al. | 375/226 |
| 2009/0224828 A1 | 9/2009 | Shako et al. | |
| 2010/0026561 A1* | 2/2010 | Takano et al. | 342/174 |
| 2010/0172653 A1* | 7/2010 | Yonenaga et al. | 398/154 |
| 2010/0232493 A1* | 9/2010 | Thirumoorthy | 375/232 |
| 2010/0272208 A1* | 10/2010 | Feigin et al. | 375/268 |
| 2011/0009080 A1 | 1/2011 | Seendripu et al. | |
| 2011/0013724 A1* | 1/2011 | Metreaud et al. | 375/296 |
| 2012/0014472 A1* | 1/2012 | Zhao | 375/285 |

OTHER PUBLICATIONS

Maeda et al., "Wideband Image-Rejection Circuit for Low-IF Receiver" in ISSCC Session 26: Cellular Building Blocks and Socs 26.4, 2006 IEEE Solid-State Circuits Conference, Feb. 2006, 10 pages total.

International search report for International application No. PCT/CN2009/074869, Aug. 19, 2010, 11 pages.

Office Action of related U.S. Appl. No. 13/250,278, mailed Apr. 9, 2012, 16 pages total.

Office Action issued in corresponding Russian Patent Application No. 2011131781/07, mailed Jul. 6, 2013, 11 pages.

Extended European Search Report issued in corresponding European Patent Application No. 09845358.2, mailed Nov. 22, 2012.

Written opinion issued in corresponding PCT patent application No. PCT/CN2009/074869, dated Aug. 19, 2010, 4 pages.

* cited by examiner

TO FIG.11B

METHOD, APPARATUS, AND SYSTEM FOR MICROWAVE SIGNAL CORRECTION

CROSS-REFERENCE TO RELATED APPLICATION

This application is a continuation of International Application No. PCT/CN2009/074869, filed on Nov. 9, 2009, which is hereby incorporated by reference in its entireties.

FIELD OF THE INVENTION

The present invention relates to the microwave communication technology, and in particular to a method, an apparatus, and a system for microwave signal correction.

BACKGROUND

With the microwave technology, data is directly transmitted over the air without the need of deploying optical fibers or cables. The microwave technology has obvious engineering advantages in cities, remote areas, or special areas (for example, river). The microwave technology features convenient networking, flexible usage, and short service deployment time. With the development of the microwave technology, the cost of the microwave device is gradually reduced. Therefore, the microwave technology becomes increasingly widely used.

Certain phenomena affect the transmission quality of microwave signals in microwave technology. For example, the non-linear amplifier leads to signal distortion, and the inband fluctuation of the channel filter leads to the imbalance of the gain. To improve the transmission quality of microwave signals, the signal to noise ratio (SNR) of the transmitter needs to be improved. This problem is solved generally through error correction.

The existing error correction method is as follows: extracting certain transmit signals of the transmitter; obtaining a feedback IQ signal after performing sampling through the downward frequency conversion, band-pass filter, and analog to digital converter (ADC); calculating by the error calculation unit the error signal of the transmission channel according to the original IQ signal and the feedback IQ signal; performing pre-distortion processing for the transmitted data according to the error signal; and then transmitting the data through the transmission channel.

The existing error correction technology has at least the following disadvantages: The sampling circuit, downward frequency converter, band-pass filter, and ADC need to be provided, which directly increases the system cost and power consumption. In addition, only the error of the transmitter can be corrected, but the error introduced by the receiver cannot be corrected.

SUMMARY

A method, an apparatus, and a system for microwave signal correction are provided in embodiments of the present invention to correct microwave signals without such components as a sampling circuit, a downward frequency converter, a band-pass filter, and an ADC.

To achieve the preceding objective, the embodiments of the present invention provide the technical solution as follows:

A method for microwave signal correction is provided in one embodiment of the present invention. The method includes:

receiving a first radio frequency (RF) signal from a transmitter, wherein a microwave frame of the first RF signal carries an original IQ signal;

sampling the first RF signal to obtain sampling data, and obtaining a feedback IQ signal from the sampling data;

demodulating the sampling data to restore the microwave frame and to obtain the original IQ signal;

obtaining an error signal through error calculation by using the original IQ signal and the feedback IQ signal; and performing signal correction by using the error signal.

A method for microwave signal correction is provided in another embodiment of the present invention. The method includes:

receiving a first RF signal from a transmitter;

sampling the first RF signal to obtain sampling data, and obtaining a feedback IQ signal from the sampling data; and transmitting a second RF signal to the transmitter, wherein the second RF signal carries the feedback IQ signal and the transmitter corrects the transmitted RF signal by using the feedback IQ signal.

A method for microwave signal correction is provided in another embodiment of the present invention. The method includes:

receiving a first RF signal from a transmitter;

sampling the first RF signal to obtain sampling data, and obtaining a feedback IQ signal from the sampling data;

obtaining an error signal through error calculation using the feedback IQ signal; and transmitting a second RF signal to the transmitter, wherein the second RF signal carries the error signal and the transmitter corrects the transmitted RF signal by using the error signal.

An apparatus for microwave signal correction is provided in an embodiment of the present invention. The apparatus includes:

a receiving unit, configured to receive a first RF signal from a transmitter, wherein a microwave frame of the first RF signal carries an original IQ signal;

an obtaining unit, configured to sample the first RF signal to obtain sampling data and obtain a feedback IQ signal from the sampling data; and further configured to demodulate the sampling data to restore the microwave frame and obtain the original IQ signal;

an error calculation unit, configured to obtain an error signal through error calculation using the original IQ signal and the feedback IQ signal; and a correcting unit, configured to perform signal correction by using the error signal.

An apparatus for microwave signal correction is provided in another embodiment of the present invention. The apparatus includes:

a receiving unit, configured to receive a first RF signal from a transmitter;

an obtaining unit, configured to sample the first RF signal to obtain sampling data, and obtain a feedback IQ signal from the sampling data; and a transmitting unit, configured to transmit a second RF signal to the transmitter, wherein the second RF signal carries the feedback IQ signal and the transmitter corrects the transmitted RF signal by using the feedback IQ signal.

An apparatus for microwave signal correction is provided in another embodiment of the present invention. The apparatus includes:

a receiving unit, configured to receive a first RF signal from a transmitter an obtaining unit, configured to sample the first RF signal to obtain sampling data, and obtain a feedback IQ signal from the sampling data;

an error calculation unit, configured to obtain an error signal through error calculation using the original IQ signal and the feedback IQ signal; and a transmitting unit, configured to transmit a second RF signal to the transmitter, wherein the second RF signal carries the error signal and the transmitter corrects the transmitted RF signal by using the error signal.

A system for microwave signal correction is provided in an embodiment of the present invention. The system includes:

a transmitter, configured to transmit a first RF signal to a receiver, a microwave frame of the first RF signal carrying an original IQ signal; and the receiver, configured to receive the first RF signal; sample the first RF signal to obtain the sampling data and obtain a feedback IQ signal from the sampling data; demodulate the sampling data to restore the microwave frame and obtain the original IQ signal; obtain an error signal through error calculation using the original IQ signal and the feedback IQ signal; and perform signal correction by using the error signal.

A system for microwave signal correction is provided in an embodiment of the present invention. The system includes:

a transmitter, configured to transmit a first RF signal to a receiver; and the receiver, configured to receive the first RF signal; sample the first RF signal to obtain the sampling data and obtain a feedback IQ signal from the sampling data; and transmit a second RF signal to the transmitter, the second RF signal carrying the feedback IQ signal;

wherein, the transmitter is further configured to receive the second RF signal and perform signal correction by using the feedback IQ signal.

A system for microwave signal correction is provided in an embodiment of the present invention. The system includes:

a transmitter, configured to transmit a first RF signal to a receiver; and the receiver, configured to receive the first RF signal; sample the first RF signal to obtain the sampling data and obtain a feedback IQ signal from the sampling data; obtain an error signal through error calculation using the feedback IQ signal; and transmit a second RF signal to the transmitter, the second RF signal carrying the feedback IQ signal;

wherein, the transmitter is further configured to receive the second RF signal and correct the transmitted RF signal by using the error signal.

According to the method, apparatus, and system for microwave signal correction provided in the embodiments of the present invention, the receiver samples the frequency signal from the transmitter to obtain sampling data and obtain the feedback IQ signal from the sampling data, and performs signal correction by using the feedback IQ signal. Sampling the received RF signal does not need an additional component. The receiving channel installed in the receiver can be used to receive the RF signal, which reduces the cost and power consumption. The feedback IQ signal is the signal processed by the receiving channel. In the error correction process of the transmitter, the error introduced by the receiving channel of the transmitter can be corrected.

BRIEF DESCRIPTION OF THE DRAWINGS

To make the technical solution of the present invention clearer, the accompanying drawings for illustrating the embodiments of the present invention or the prior art are outlined below. Apparently, the accompanying drawings are for the exemplary purpose only, and person having ordinary skill in the art can derive other drawings from such accompanying drawings without any creative effort.

DETAILED EMBODIMENTS

Figure 1:
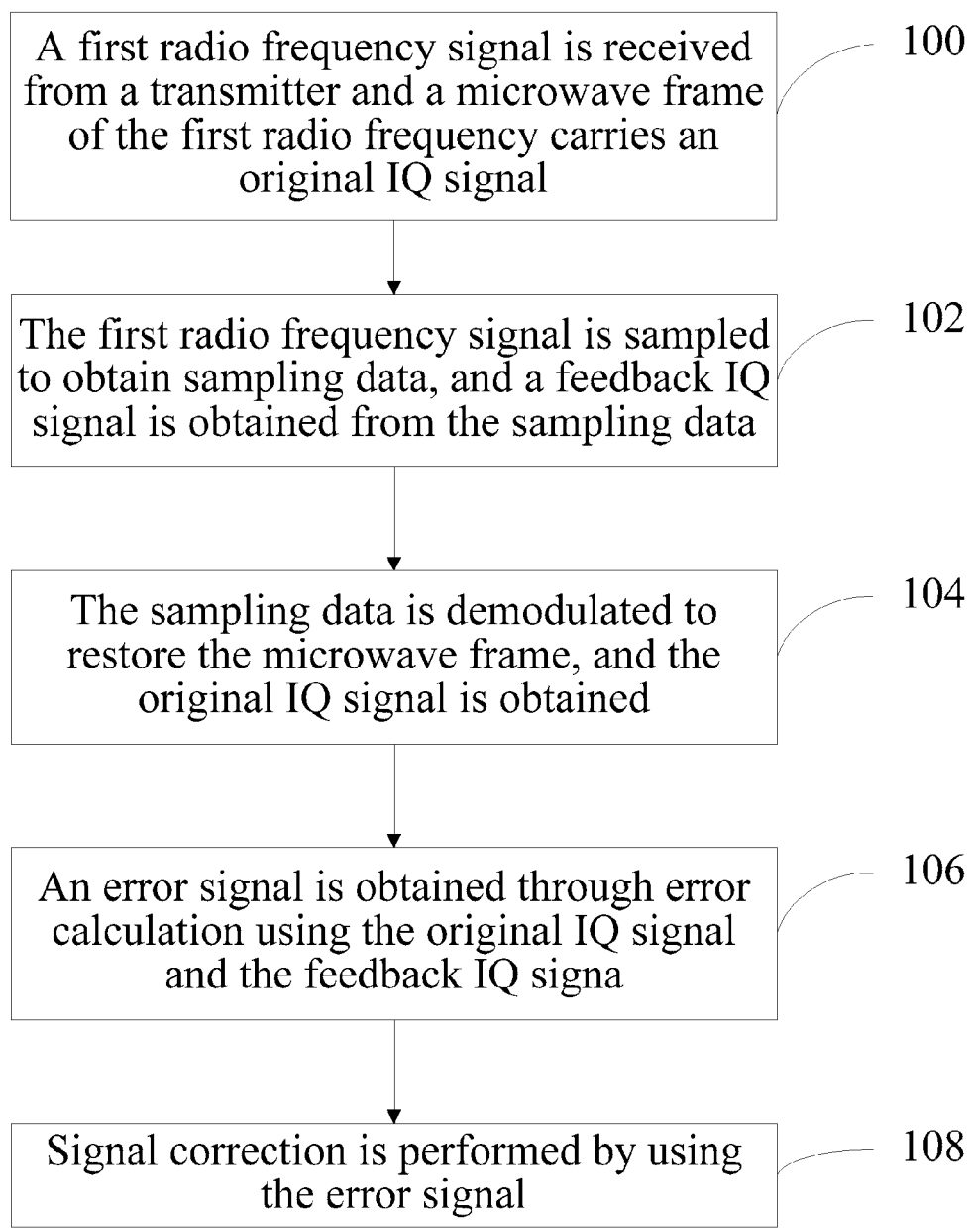
FIG. 1 is a flow chart of a method for microwave signal error correction according to one embodiment of the present invention.

The following section describes in detail the technical solution provided in various embodiments of the present invention in combination with the accompanying drawings. It is obvious that the described embodiments are only for exemplary. Based on embodiments of the present invention, other embodiments that are made by those skilled in the art without creative efforts should be covered under the protection scope of the present invention. In addition, the following embodiments are optional in the present invention. The sequence and numbering of the embodiments are random.

In various embodiments of this invention, a transmitter transmits a signal to a receiver. In the process of transmitting the signal by the transmitter or receiving the signal by the receiver, an error may be produced. A method, an apparatus and a system provided in various embodiments of the present invention are directed to error correction. The error produced during the process of transmitting the signal by the receiver to the transmitter can be corrected according to various embodiments of the present invention or similar embodiments. The transmitter and receiver can have both the receiving function and the transmission function. In various embodiments of the present invention, the transmitter and receiver are named for the convenience of description. In the actual application, the transmitter and receiver are integrated in a transceiver. Therefore, the receiving and transmission functions are supported at the same time.

In embodiments of the present invention, the transmitter generates an original IQ signal, which can be implemented by a service processing unit and modulator, obtains a RF signal through processing such as digital to analog conversion (DAC) and upward frequency conversion on the transmitting channel, and then transmits the obtained RF signal to a receiver; the receiver receives the RF signal from the transmitter, obtains sampling data used for demodulation through processing such as downward frequency conversion and ADC on the receiving channel, and then extracts part of the sampling data to act as a feedback IQ signal. Through processing on the transmitting channel of the transmitter and the receiving channel of the receiver, the original IQ signal changes, increasing the imbalance of the amplitude and phase of the IQ signal, gain error on the channel, and non-linear error. As a result, the demodulation performance of the system deteriorates. In this case, the error is corrected by using the feedback IQ signal. The RF signal transmitted by the transmitter or the RF signal received by the receiver are corrected to reduce the error produced by the analog channel of the transceiver and thus to achieve the optimal demodulation performance in the system.

In certain embodiments, the transmitter adds the original IQ signal to a microwave frame and transmits it to the receiver in the form of data. The receiver can extract the original IQ signal from the microwave frame. The original IQ signal extracted by the receiver is the same as the original IQ signal added to the microwave frame by the transmitter.

Embodiment 1

As shown in FIG. 1, a method for microwave signal error correction includes:

Step 100: A first RF signal is received from a transmitter, where a microwave frame of the first RF signal carries an original IQ signal in it.

Step 102: The first RF signal is sampled to obtain sampling data, and a feedback IQ signal is obtained from the sampling data.

Step 104: The sampling data is demodulated to restore the microwave frame, and the original IQ signal is obtained.

Step 106: An error signal is obtained through error calculation using the original IQ signal and the feedback IQ signal.

Step 108: Signal correction is performed by using the error signal.

In this embodiment, the first RF signal is received from the transmitter, wherein a microwave frame of the first RF signal carries the original IQ signal; the first RF signal is sampled to obtain the sampling data, and the feedback IQ signal is obtained from the sampling data; the error signal is obtained through error calculation using the original IQ signal and feedback IQ signal; and signal correction is carried out by using the error signal.

Compared with the prior art, sampling the received RF signal does not need an additional component. The receiving channel installed in the receiver can be used to receive the RF signal, which reduces the cost and power consumption. The feedback IQ signal is the signal processed by the receiving channel. In the error correction process of the transmitter, the error introduced by the receiving channel of the transmitter can be corrected.

Embodiment 2

Figure 2:
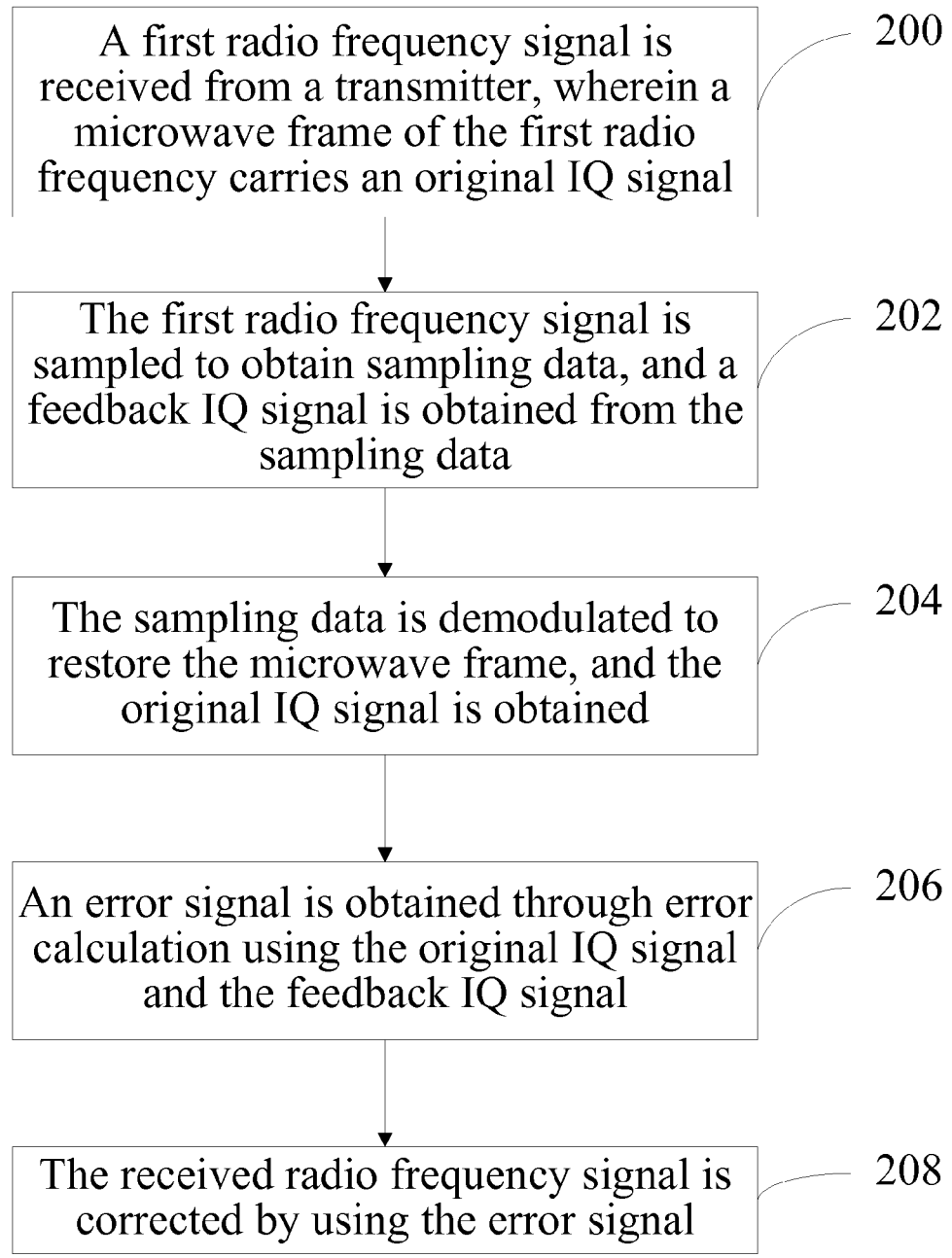
FIG. 2 is a flow chart of another method for microwave signal error correction according to one embodiment of the present invention.

As shown in FIG. 2, another method for microwave signal error correction includes:

Step 200: A first RF signal is received from a transmitter, where a microwave frame of the first RF signal carries an original IQ signal.

The original IQ signal generated by the transmitter is divided into two original IQ signals. One original IQ signal is extracted into the microwave frame, and then is transmitted to the receiver through the transmission channel after processing by the service processing unit and modulator. In such a case, the microwave frame of the RF signal received by the receiver carries the original IQ signal. The other original IQ signal is processed through the DAC and upward frequency conversion to obtain the RF signal, and then the RF signal is transmitted to the receiver.

Step 202: The first RF signal is sampled to obtain sampling data, and a feedback IQ signal is obtained from the sampling data.

Through the processing such as the downward frequency conversion and ADC, the sampling data is obtained. Then, the feedback IQ signal is obtained from the sampling data. A part of sampling data can be extracted to act as the feedback IQ signal directly.

Step 204: The sampling data is demodulated to restore the microwave frame, and the original IQ signal is obtained.

Through demodulation of the sampling data, the microwave frame can be restored so that the original IQ signal stored in the microwave frame is obtained, which can be implemented by the demodulator and service processing unit.

Step 206: An error signal is obtained through error calculation using the original IQ signal and the feedback IQ signal.

Step 208: The received RF signal is corrected by using the error signal.

The error correction can be implemented by the demodulator and service processing unit.

In this embodiment, the received RF signal is directly corrected by using the error signal so that the receiving performance of the receiver is improved.

Embodiment 3

Figure 3:
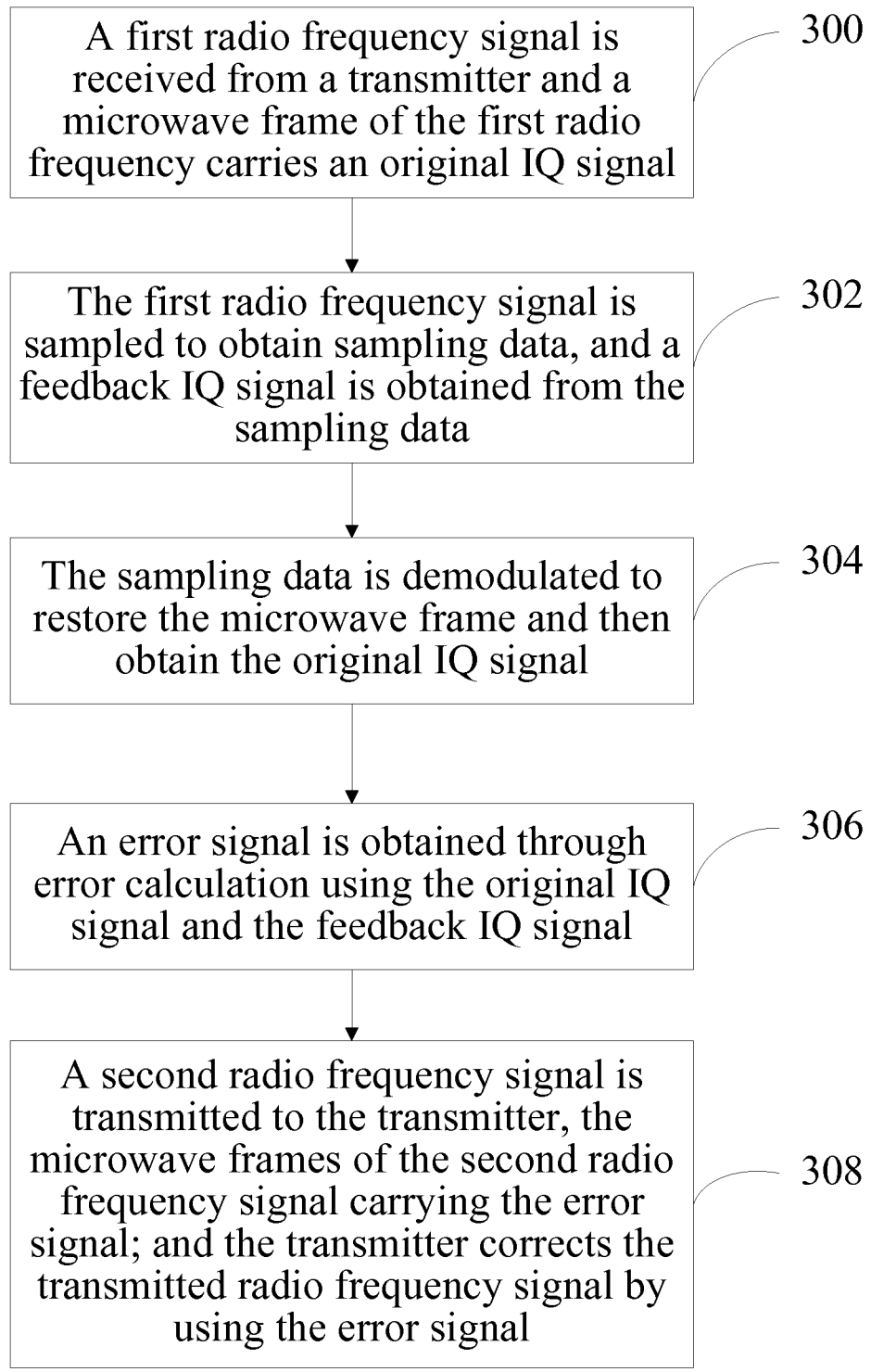
FIG. 3 is a flow chart of another method for microwave signal error correction according to one embodiment of the present invention.

As shown in FIG. 3, another method for microwave signal error correction includes:

Step 300: A first RF signal is received from a transmitter, wherein a microwave frame of the first RF signal carries an original IQ signal.

The original IQ signal generated by the transmitter is divided into two original IQ signals. One original IQ signal is extracted into the microwave frame, and then is transmitted to the receiver through the transmission channel after processing by the service processing unit and modulator. In such a case, the microwave frame of the RF signal received by the receiver carries the original IQ signal. The other original IQ signal is processed through the DAC and upward frequency conversion to obtain the RF signal, and then the RF signal is transmitted to the receiver.

Step 302: The first RF signal is sampled to obtain sampling data, and a feedback IQ signal is obtained from the sampling data.

The feedback IQ signal is obtained through the processing such as the downward frequency conversion and ADC.

Step 304: The sampling data is demodulated to restore the microwave frame, and the original IQ signal is obtained.

Through demodulation of the sampling data by the demodulator and service processing unit, the microwave frame can be restored so that the original IQ signal stored in the microwave frame is obtained.

Step 306: An error signal is obtained through error calculation using the original IQ signal and the feedback IQ signal.

Step 308: A second RF signal is transmitted to the transmitter, wherein the second RF signal carries the error signal in a microwave frame and the transmitter corrects the transmitted RF signal by using the error signal.

The service processing unit and modulator can correct the transmitted RF signal by using the error signal, which is the prior art and is not described here.

In this embodiment, the error signal is transmitted to the transmitter, and the transmitter corrects the transmitted RF signal by using the error signal. This improves both the transmission performance of the transmitter and the receiving performance of the receiver.

Embodiment 4

Figure 4:
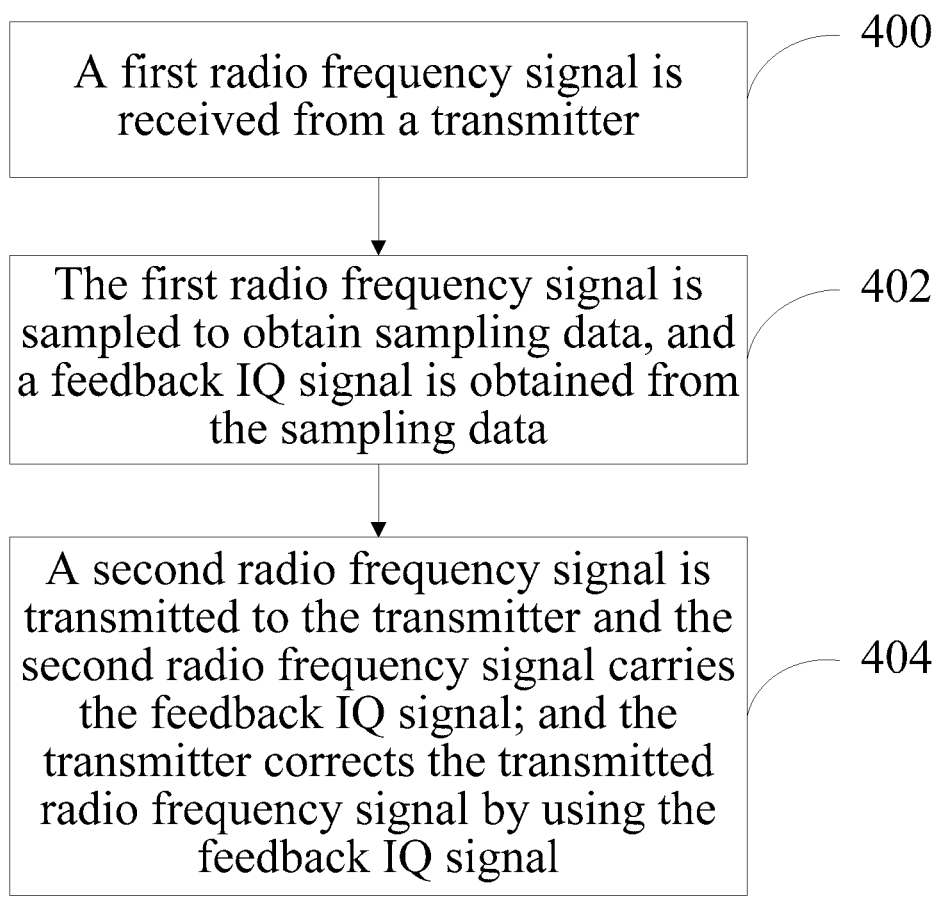
FIG. 4 is a flow chart of another method for microwave signal error correction according to one embodiment of the present invention.

As shown in FIG. 4, another method for microwave signal error correction includes:

Step 400: A first RF signal is received from a transmitter.

Step 402: The first RF signal is sampled to obtain sampling data, and a feedback IQ signal is obtained from the sampling data.

Step 404: A second RF signal is transmitted to the transmitter, where the second RF signal carries the feedback IQ signal and the transmitter corrects the transmitted RF signal by using the feedback IQ signal.

In this embodiment, the first RF signal is received from the transmitter; the first RF signal is sampled to obtain the sampling data and then the feedback IQ signal is obtained from the sampling data; and the second RF signal is transmitted to the transmitter, where the second RF signal carries the feedback IQ signal and the transmitter performs error correction by using the feedback IQ signal. Sampling the received RF signal does not need an additional component. The receiving channel installed in the receiver can be used to receive the RF signal, which reduces the cost and power consumption. The feedback IQ signal is the signal processed by the receiving channel. In the error correction process of the transmitter, the error introduced by the receiving channel of the transmitter can be corrected.

Embodiment 5

Figure 5:
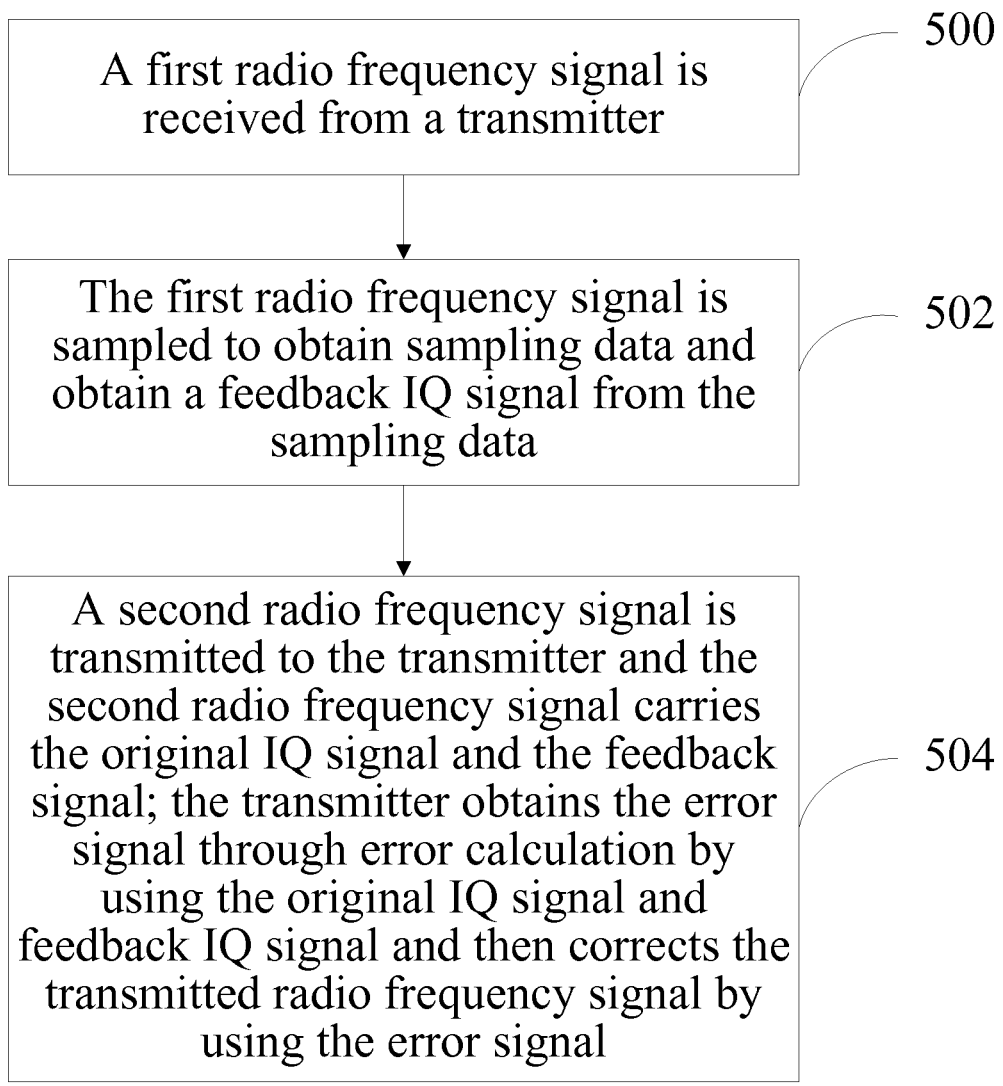
FIG. 5 is a flow chart of another method for microwave signal error correction according to one embodiment of the present invention.

As shown in FIG. 5, another method for microwave signal error correction includes:

Step 500: A first RF signal is received from a transmitter.

The original IQ signal generated by the service processing unit and modulator of the transmitter is divided into two original IQ signals. One original IQ signal is extracted to the local end. The other original IQ signal is directly transmitted to the receiver through the transmission channel. That is, the RF signal is obtained through the processing such as the DAC and upward frequency conversion on the transmission channel, and then is transmitted to the receiver.

Step 502: The first RF signal is sampled to obtain sampling data, and a feedback IQ signal is obtained from the sampling data.

Step 504: A second RF signal is transmitted to the transmitter, where the second RF signal carries the feedback IQ signal. The transmitter obtains the error signal through error calculation by using the original IQ signal and feedback IQ signal and then corrects the transmitted RF signal by using the error signal.

The transmitter performs calculates the error by using the original IQ signal at the local end and the feedback IQ signal.

In this embodiment, the feedback IQ signal is transmitted to the transmitter. The transmitter obtains the error signal through error calculation by using the original IQ signal and feedback IQ signal and then corrects the transmitted RF signal by using the error signal. This improves both the transmission performance of the transmitter and the receiving performance of the receiver.

Embodiment 6

In this embodiment, the original IQ signal is not carried in a microwaves frame of the RF signal.

Figure 6:
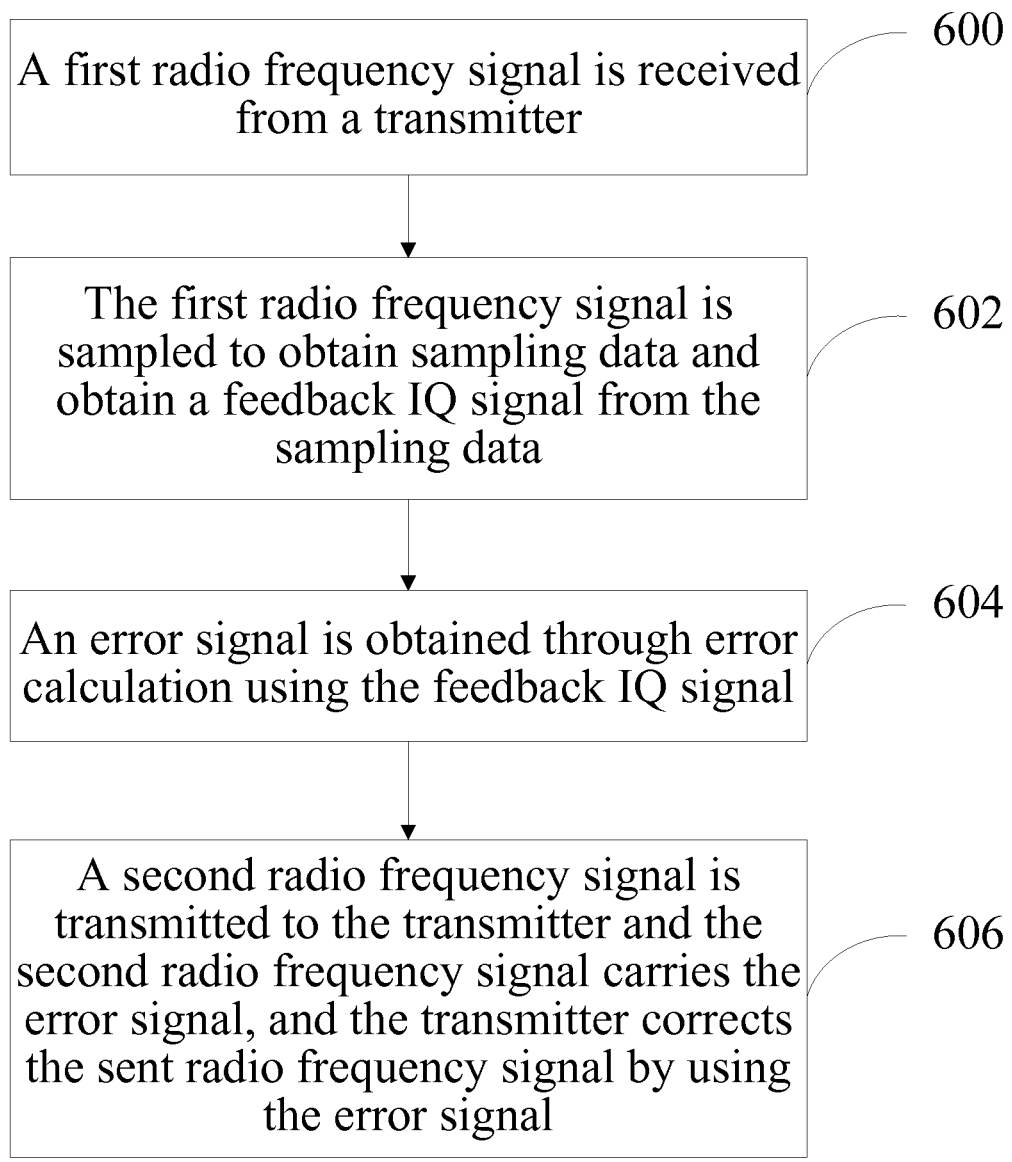
FIG. 6 is a flow chart of another method for microwave signal error correction according to one embodiment of the present invention.

As shown in FIG. 6, another method for microwave signal error correction includes:

Step 600: A first RF signal is received from a transmitter.

The service processing unit and modulator of the transmitter generate the original IQ signal. The transmitter obtains the RF signal through the processing such as the DAC and upward frequency conversion, and then transmits the RF signal to the receiver.

Step 602: The first RF signal is sampled to obtain sampling data, and a feedback IQ signal is obtained from the sampling data.

Step 604: An error signal is obtained through error calculation using the feedback IQ signal.

In this embodiment, the error signal is obtained through error correction using the feedback IQ signal directly, for example, calculation based on the time domain equalization (TEQ). Because the error is calculated according to the feedback IQ signal, the error correction effect weakens slightly. The data transmitted between the transmitter and receiver is reduced.

Step 606: A second RF signal is transmitted to the transmitter, where the second RF signal carries the error signal and the transmitter corrects the transmitted RF signal by using the error signal.

In this embodiment, the first RF signal is received from the transmitter; the first RF signal is sampled to obtain the sampling data, and the feedback IQ signal is obtained from the sampling data; the error signal is obtained through error calculation using the feedback IQ signal; the second RF that carries the error signal is transmitted to the transmitter, and then the transmitter corrects the transmitted RF by using the error signal. Sampling the received RF signal does not need an additional component. The receiving channel installed in the receiver can be used to receive the RF signal, which reduces the cost and power consumption. The feedback IQ signal is the signal processed by the receiving channel. In the error correction process of the transmitter, the error introduced by the receiving channel of the transmitter can be corrected.

Embodiment 7

Figure 7:
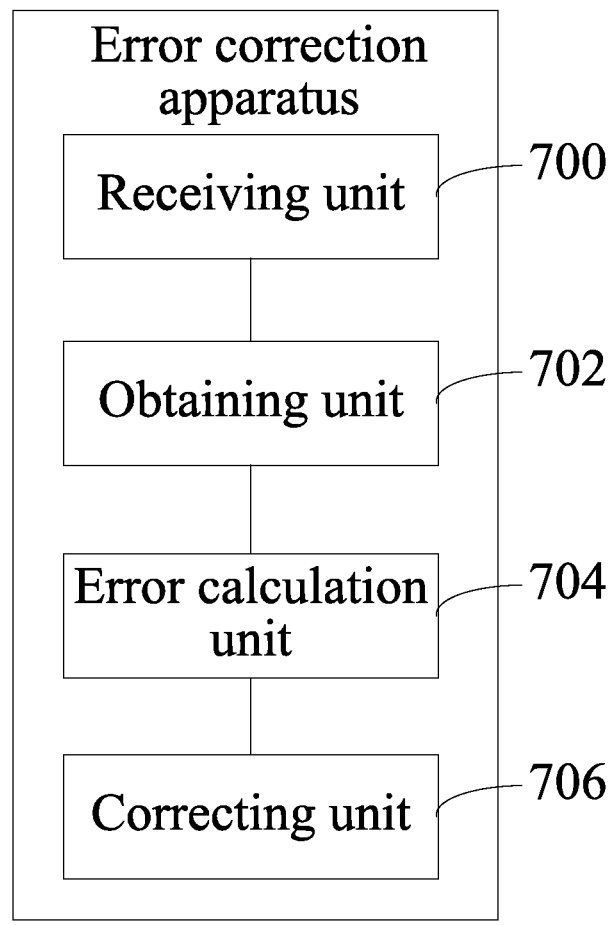
FIG. 7 is a structural view of an apparatus for microwave signal error correction according to one embodiment of the present invention.

As shown in FIG. 7, an apparatus for microwave signal error correction includes: a receiving unit 700, an obtaining unit 702, an error calculation unit 704, and a correcting unit 706.

The receiving unit 700 is configured to receive a first RF signal from a transmitter, where a microwave frame of the first RF signal carries an original IQ signal.

The obtaining unit 702 is configured to sample the first RF signal to obtain sampling data and obtain a feedback IQ signal from the sampling data; and is further configured to demodulate the sampling data to restore the microwave frame and obtain the original IQ signal.

The error calculation unit 704 is configured to obtain an error signal through error calculation using the original IQ signal and the feedback IQ signal.

The correcting unit 706 is configured to perform signal correction by using the error signal.

In this embodiment, the receiving unit receives the first RF signal from the transmitter, where the microwave frame of the first RF signal carries the original IQ signal; the obtaining unit samples the first RF signal to obtain the sampling data, and then obtains the feedback IQ signal from the sampling data; the sampling data is demodulated to restore the microwave frame and then obtain the original IQ signal; the error calculation unit calculates the error by using the original IQ signal and feedback IQ signal to obtain the error signal; and the correcting unit performs signal correction by using the error signal. Compared with the prior art, sampling the received RF signal does not need an additional component. The receiving channel installed in the receiver can be used to receive the RF signal, which reduces the cost and power consumption. The feedback IQ signal is the signal processed by the receiving channel. In the error correction process of the transmitter, the error introduced by the receiving channel of the transmitter can be corrected.

Embodiment 8

As shown in FIG. 7, another apparatus for microwave signal error correction includes: a receiving unit 700, an obtaining unit 702, an error calculation unit 704, and a correcting unit 706.

The receiving unit 700 is configured to receive a first RF signal from a transmitter, where a microwave frame of the first RF signal carries an original IQ signal.

The original IQ signal generated by the transmitter is divided into two original IQ signals. One original IQ signal is extracted into the microwave frame, and then is transmitted to the receiver through the transmission channel after processing by the service processing unit and modulator. In such a case, the microwave frame of the RF signal received by the receiver carries the original IQ signal. The other original IQ signal is processed through the DAC and upward frequency conversion to obtain the RF signal, and then the RF signal is transmitted to the receiver.

The obtaining unit 702 is configured to sample the first RF signal to obtain sampling data and obtain a feedback IQ signal from the sampling data; and is further configured to demodulate the sampling data to restore the microwave frame and obtain the original IQ signal.

Through the processing such as the downward frequency conversion and ADC, the sampling data is obtained. Then, the feedback IQ signal is obtained from the sampling data. Through demodulation of the sampling data, the microwave frame can be restored so that the original IQ signal stored in the microwave frame is obtained, which can be implemented by the demodulator and service processing unit.

The error calculation unit 704 is configured to obtain an error signal through error calculation using the original IQ signal and the feedback IQ signal.

The correcting unit 706 is configured to perform signal correction by using the error signal.

The correcting unit 706 is specifically configured to correct the received RF signal by using the error signal, which can be implemented through the demodulator and the service processing unit.

In this embodiment, the correcting unit corrects the received RF signal by using the error signal so that the receiving performance of the receiver is improved.

Embodiment 9

As shown in FIG. 7, another apparatus for microwave signal error correction includes: a receiving unit 700, an obtaining unit 702, an error calculation unit 704, and a correcting unit 706.

The receiving unit 700 is configured to receive a first RF signal from a transmitter, wherein a microwave frame of the first RF signal carries an original IQ signal.

The original IQ signal generated by the transmitter is divided into two original IQ signals. One original IQ signal is extracted into the microwave frame, and then is transmitted to the receiver through the transmission channel after processing by the service processing unit and modulator. In such a case, the microwave frame of the RF signal received by the receiver carries the original IQ signal. The other original IQ signal is processed through the DAC and upward frequency conversion to obtain the RF signal, and then the RF signal is transmitted to the receiver.

The obtaining unit 702 is configured to sample the first RF signal to obtain sampling data and obtain a feedback IQ signal from the sampling data; and further configured to demodulate the sampling data to restore the microwave frame and obtain the original IQ signal.

The error calculation unit 704 is configured to obtain an error signal through error calculation using the original IQ signal and the feedback IQ signal.

The correcting unit 706 is configured to perform signal correction using the error signal.

The correcting unit 706 is further configured to transmit a second RF signal to the transmitter, where the second RF signal carries the error signal and the transmitter corrects the transmitted RF signal by using the error signal.

In this embodiment, the correcting unit transmits the error signal to the transmitter, and the transmitter corrects the transmitted RF signal by using the error signal. This improves both the transmission performance of the transmitter and the receiving performance of the receiver.

Embodiment 10

Figure 8:
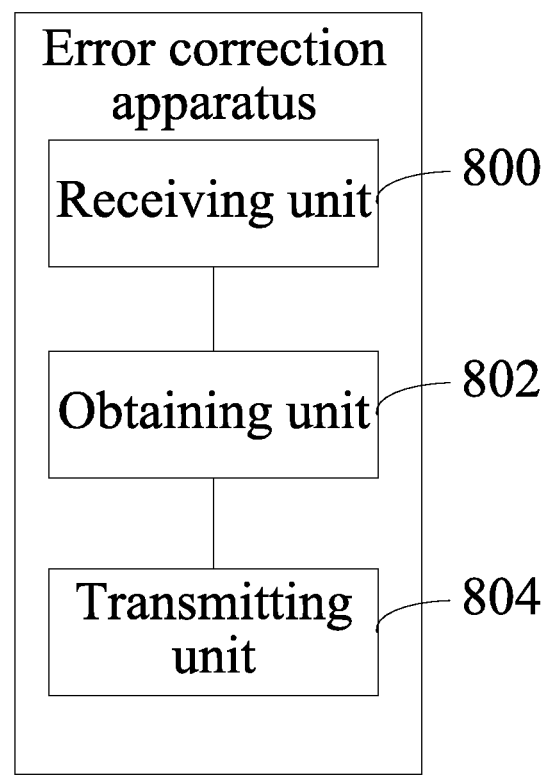
FIG. 8 is a structural view of another apparatus for microwave signal error correction according to one embodiment of the present invention.

As shown in FIG. 8, an apparatus for microwave signal error correction includes: a receiving unit 800, an obtaining unit 802, and a transmitting unit 804.

The receiving unit 800 is configured to receive a first RF signal from a transmitter.

The original IQ signal generated by the service processing unit and modulator of the transmitter is divided into two original IQ signals. One original IQ signal is extracted to the local end. The other original IQ signal is directly transmitted to the receiver through the transmission channel. That is, the RF signal is obtained through the processing such as the DAC and upward frequency conversion on the transmission channel, and then is transmitted to the receiver.

The obtaining unit 802 is configured to sample the first RF signal to obtain sampling data, and obtain a feedback IQ signal from the sampling data.

The transmitting unit 804 is configured to transmit a second RF signal to the transmitter, where the second RF signal carries the feedback IQ signal and the transmitter corrects the transmitted RF signal by using the feedback IQ signal.

In this embodiment, the transmitter obtains the error signal through error calculation using the original IQ signal at the local end and the feedback IQ signal, and then corrects the transmitted RF signal by using the error signal.

In this embodiment, the receiving unit receives the first RF signal from the transmitter; the obtaining unit samples the first RF signal to obtain the sampling data and then obtains the feedback IQ signal from the sampling data; and the transmitting unit transmits the second RF signal to the transmitter, where the second RF signal carries the feedback IQ signal and the transmitter performs error correction by using the feedback IQ signal. Sampling the received RF signal does not need an additional component. The receiving channel installed in the receiver can be used to receive the RF signal, which reduces the cost and power consumption. The feedback IQ signal is the signal processed by the receiving channel. In the error correction process of the transmitter, the error introduced by the receiving channel of the transmitter can be corrected.

Embodiment 11

Figure 9:
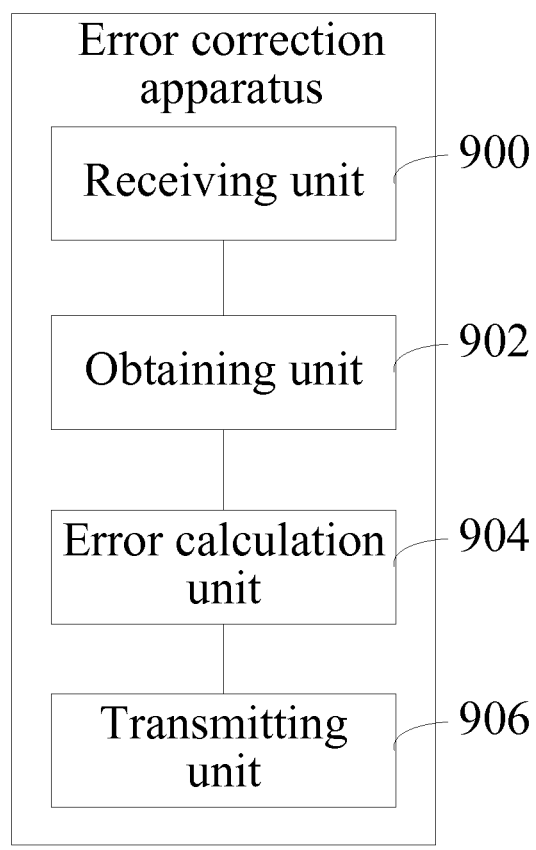
FIG. 9 is a structural view of another apparatus for microwave signal error correction according to one embodiment of the present invention.

As shown in FIG. 9, an apparatus for microwave signal error correction includes: a receiving unit 900, an obtaining unit 902, an error calculation unit, and a transmitting unit 906.

The receiving unit 900 is configured to receive a first RF signal from a transmitter.

The service processing unit and modulator of the transmitter generate the original IQ signal. The transmitter obtains the RF signal through the processing such as the DAC and upward frequency conversion, and then transmits the RF signal to the receiver.

The obtaining unit 902 is configured to sample the first RF signal to obtain sampling data, and obtain a feedback IQ signal from the sampling data.

The error calculation unit 904 is configured to obtain an error signal through error calculation using the feedback IQ signal.

In this embodiment, the error signal is obtained through error correction using the feedback IQ signal directly, for example, calculation based on the time domain equalization (TEQ). Because the error is calculated according to the feedback IQ signal, the error correction effect weakens slightly. The data transmitted between the transmitter and receiver is reduced.

The transmitting unit 906 is configured to transmit a second RF signal to the transmitter, where the second RF signal carries the error signal and the transmitter corrects the transmitted RF signal by using the error signal.

The transmitter performs calculates the error by using the original IQ signal at the local end and the feedback IQ signal.

In this embodiment, the receiving unit receives the first RF signal from the transmitter; the obtaining unit samples the first RF signal to obtain the sampling data, and obtains the feedback IQ signal from the sampling data; the error calculation unit obtains the error signal through error calculation using the feedback IQ signal; and the transmitting unit transmits the second RF signal to the transmitter, where the second RF signal carries the error signal and the transmitter corrects the transmitted RF signal by using the error signal. Sampling the received RF signal does not need an additional component. The receiving channel installed in the receiver can be used to receive the RF signal, which reduces the cost and power consumption. The feedback IQ signal is the signal processed by the receiving channel. In the error correction process of the transmitter, the error introduced by the receiving channel of the transmitter can be corrected.

Embodiment 12

Figure 10:
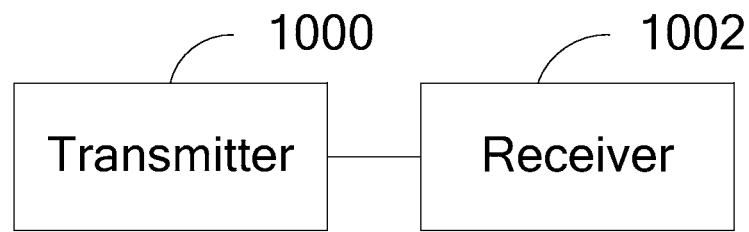
FIG. 10 is a structural view of a system for microwave signal error correction according to one embodiment of the present invention.

As shown in FIG. 10, another system for microwave signal error correction includes: a transmitter 1000 and a receiver 1002.

The transmitter 1000 is configured to transmit a first RF signal to the receiver 1002, a microwave frame of the first RF signal carrying an original IQ signal.

The receiver 1002 is configured to receive the first RF signal; sample the first RF signal to obtain the sampling data and obtain a feedback IQ signal from the sampling data; demodulate the sampling data to restore the microwave frame and obtain the original IQ signal; obtain an error signal through error calculation using the original IQ signal and the feedback IQ signal; and perform signal correction by using the error signal.

In this embodiment, the transmitter transmits first RF signal to the receiver, where the microwave frame of the first RF signal carries the original IQ signal; the receiver receives the first RF signal, and then samples the first RF signal to obtain the sampling data, and obtains the feedback IQ signal from the sampling data; the sampling data is demodulated to restore the microwave frame and then obtain the original IQ signal; and the error signal is obtained through error calculation using the original IQ signal and feedback IQ signal; and signal correction is carried out by using the error signal. Sampling the received RF signal does not need an additional component. The receiving channel installed in the receiver can be used to receive the RF signal, which reduces the cost and power consumption. The feedback IQ signal is the signal processed by the receiving channel. In the error correction process of the transmitter, the error introduced by the receiving channel of the transmitter can be corrected.

Embodiment 13

Figure 11A:
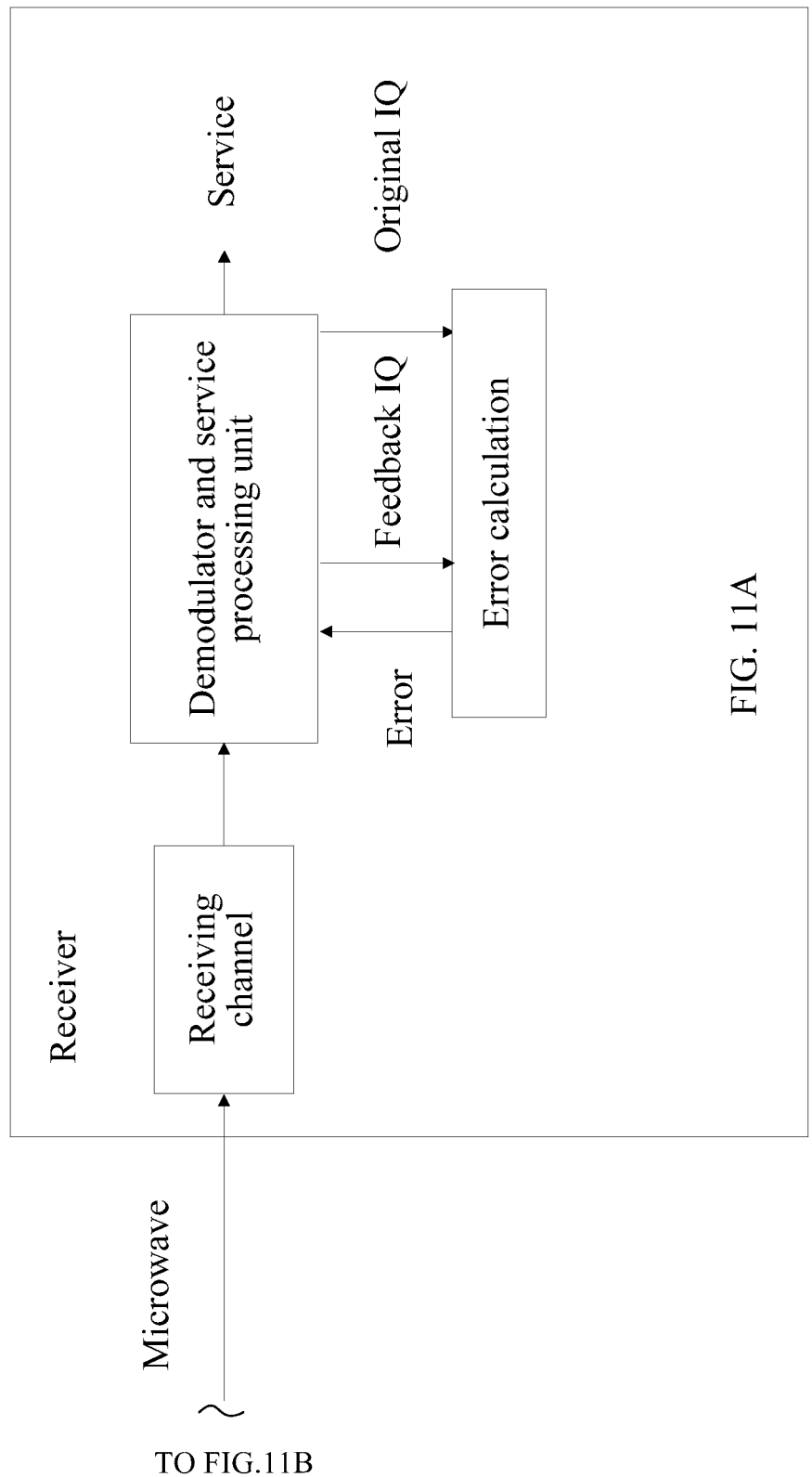
FIGS. 11A and 11B are a structural view of another system for microwave signal error correction according to one embodiment of the present invention.
Figure 11:
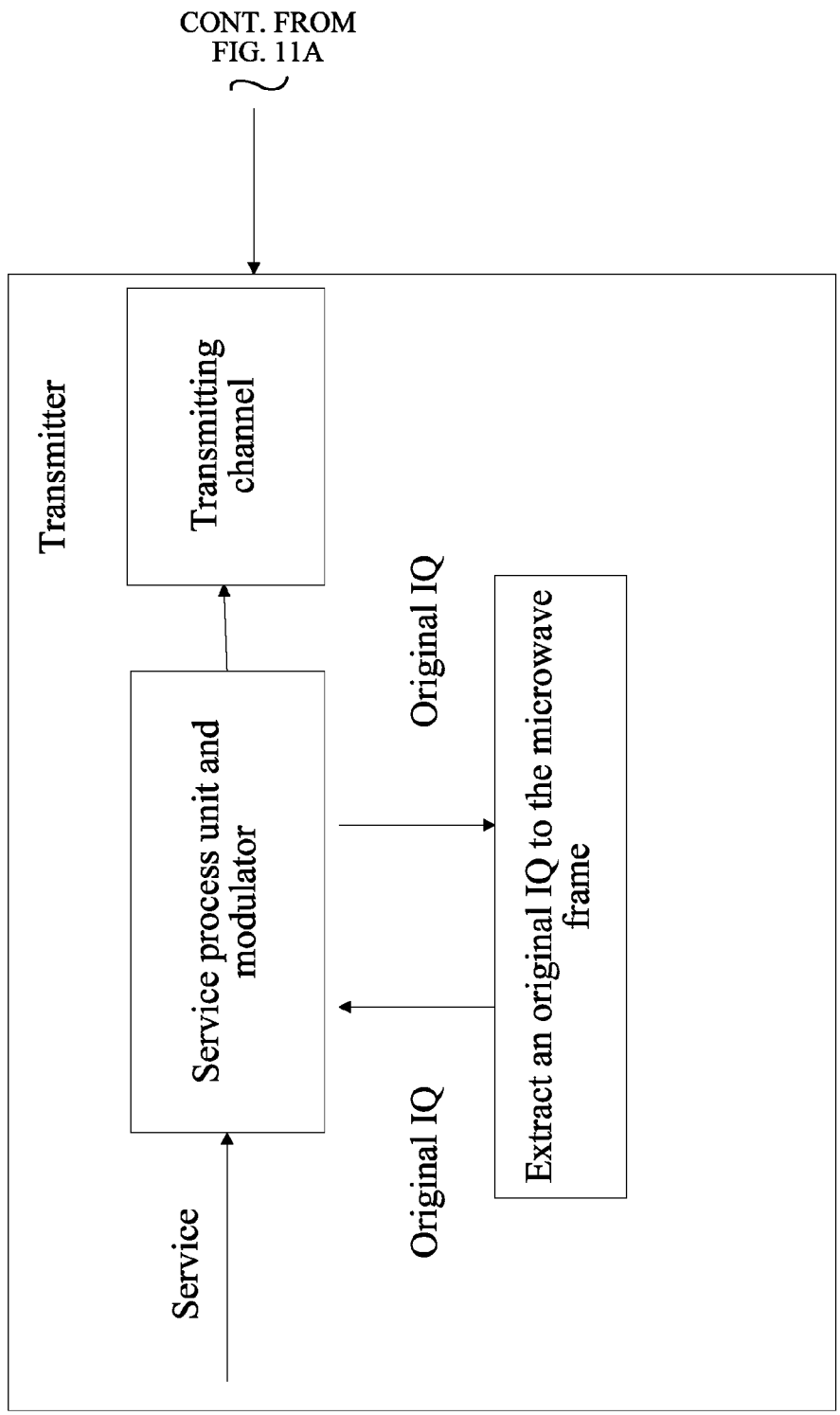

As shown in FIG. 11, another system for microwave signal error correction includes: a transmitter and a receiver.

The transmitter is configured to transmit a first radio frequency signal to a receiver, a microwave frame of the first radio frequency carrying an original IQ signal.

The original IQ signal generated by the transmitter is divided into two original IQ signals. One original IQ signal is extracted into the microwave frame, and then is transmitted to the receiver through the transmission channel after processing by the service processing unit and modulator. The other original IQ signal is directly transmitted to the receiver through the transmission channel.

The receiver is configured to receive the first RF signal; sample the first RF signal to obtain the sampling data and obtain a feedback IQ signal from the sampling data; demodulate the sampling data to restore the microwave frame and obtain the original IQ signal; obtain an error signal through error calculation using the original IQ signal and the feedback IQ signal; and perform signal correction by using the error signal.

The receiving channel of the receiver receives the first RF signal from the transmitter, and obtains the feedback IQ signal through processing such as the downward frequency conversion and ADC on the receiving channel. The microwave frame is restored through the demodulation of the sampling data by the demodulator and service processing unit so that the original IQ signal stored in the microwave frame is obtained. The error signal is obtained through error correction by using the original IQ signal and feedback IQ signal. Then, the demodulator and service processing unit correct the received RF signal by using the error signal. In general, the error calculation requires that the original IQ signal correspond to the feedback IQ signal. That is, the feedback IQ signal needs to be the IQ signal that is obtained after the original IQ signal is processed on the transmission channel of the transmitter and the receiving channel of the receiver. If the original IQ signal does not correspond to the feedback IQ signal, the error correction can also be performed, but the signal correction effect is far from optimal.

The received RF signal is corrected by using the obtained error signal; when the temperature changes, the error produced by the transmission channel of the transmitter and the receiving channel of the receiver may change. In this case, the method provided in this embodiment needs to be reused to obtain a new error signal. The received RF signal is corrected by using this new error signal. Similar case also applies to other embodiments.

In this embodiment, the receiver directly corrects the received RF signal by using the error signal so that the receiving performance of the receiver is improved.

Embodiment 14

Figure 12A:
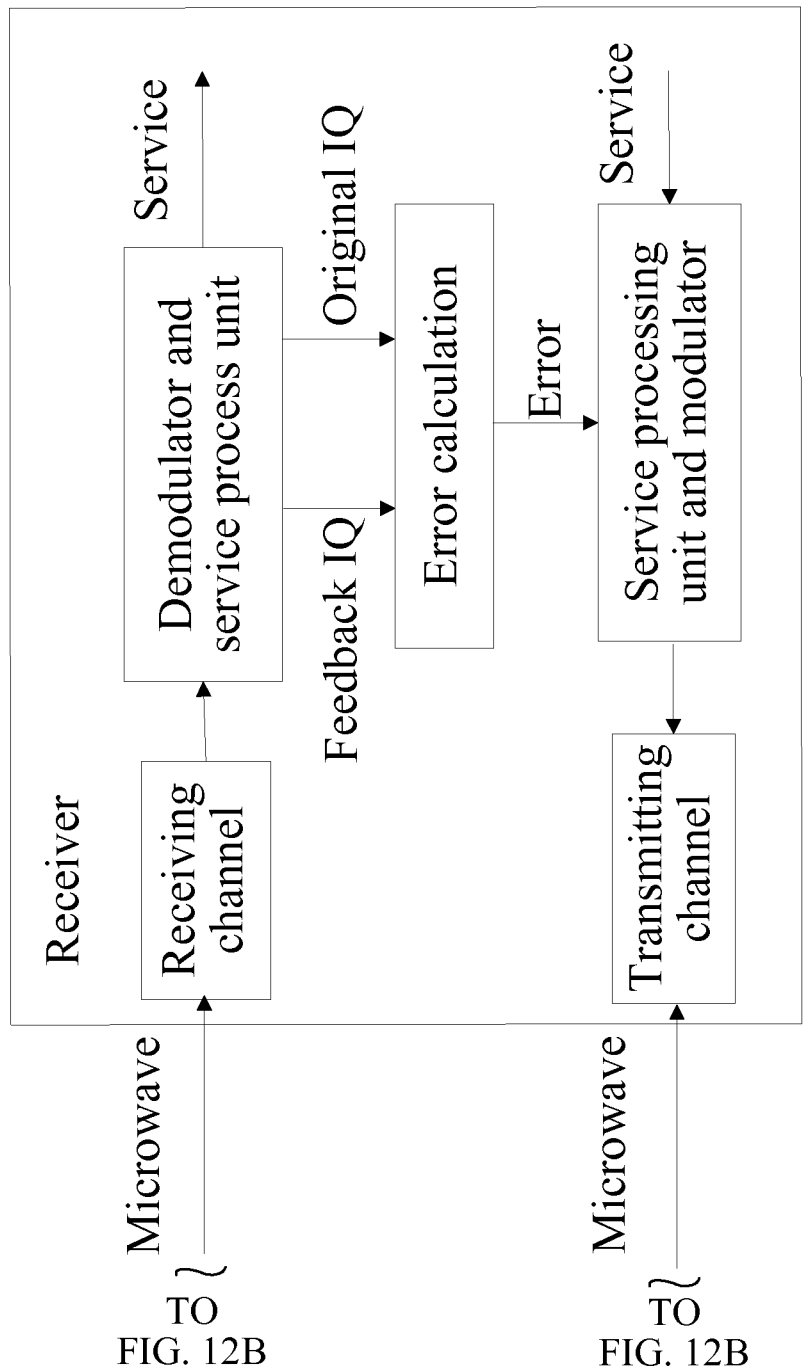
FIGS. 12A and 12B are a structural view of another system for microwave signal error correction according to one embodiment of the present invention.
Figure 12B:
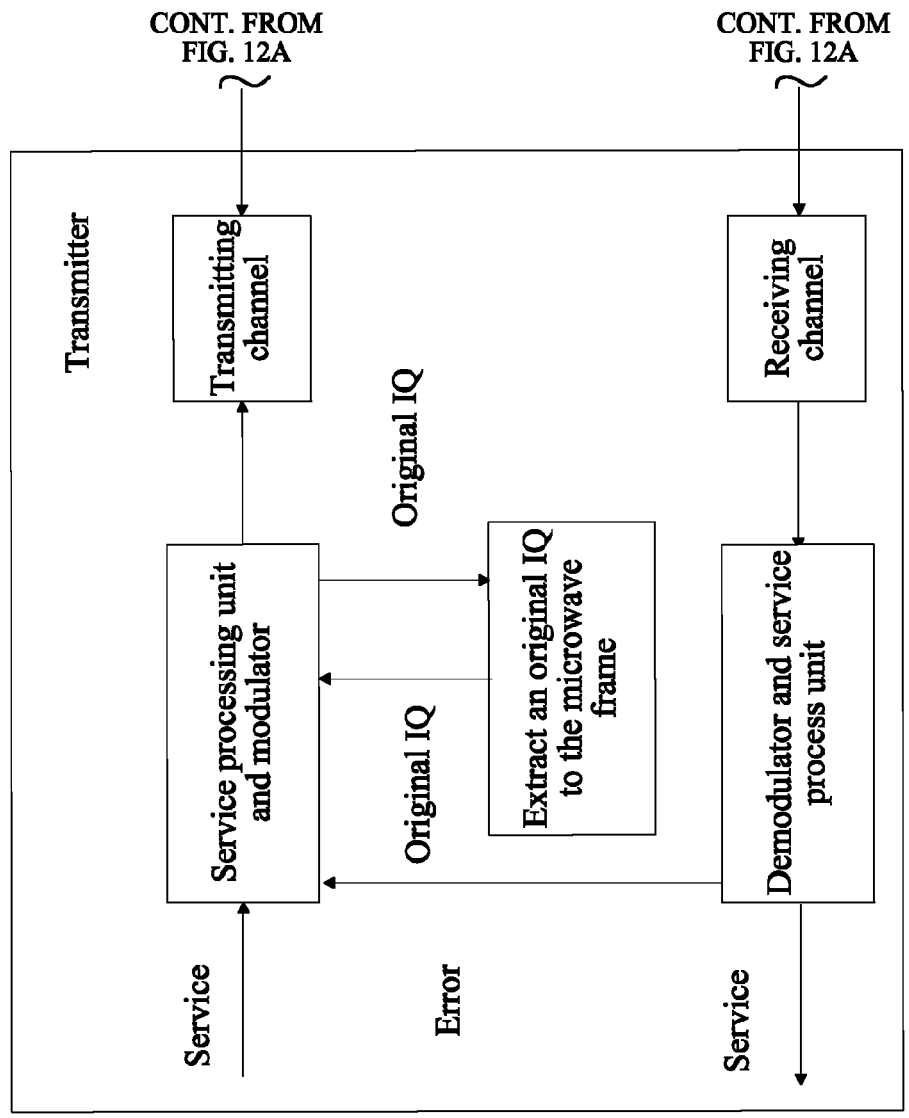

As shown in FIG. 12, another system for microwave signal error correction includes: a transmitter and a receiver.

The transmitter is configured to transmit a first RF signal to a receiver, a microwave frame of the first RF signal carrying an original IQ signal.

The original IQ signal generated by the transmitter is divided into two original IQ signals. One original IQ signal is extracted into the microwave frame, and then is transmitted to the receiver through the transmission channel after processing by the service processing unit and modulator. The other original IQ signal is directly transmitted to the receiver through the transmission channel.

The receiver 1002 is configured to receive the first RF signal; sample the first RF signal to obtain the sampling data and obtain a feedback IQ signal from the sampling data; demodulate the sampling data to restore the microwave frame and obtain the original IQ signal; obtain an error signal through error calculation using the original IQ signal and the feedback IQ signal; and perform signal correction by using the error signal.

The receiving channel of the receiver receives the first RF signal from the transmitter, and obtains the feedback IQ signal through processing such as the downward frequency conversion and ADC on the receiving channel. The microwave frame is restored through the demodulation of the sampling data by the demodulator and service processing unit so that the original IQ signal stored in the microwave frame is obtained. The error signal is obtained through error correction by using the original IQ signal and feedback IQ signal. The receiver transmits the second RF signal to the transmitter, where the microwave frame of the second RF signal carries the error signal. The transmitter corrects the transmitted RF signals by using the error signal.

In this embodiment, the error signal is transmitted to the transmitter, and the transmitter corrects the transmitted RF signal by using the error signal. This improves the transmission performance of the transmitter and improves the receiving performance of the receiver.

Embodiment 15

Figure 13:
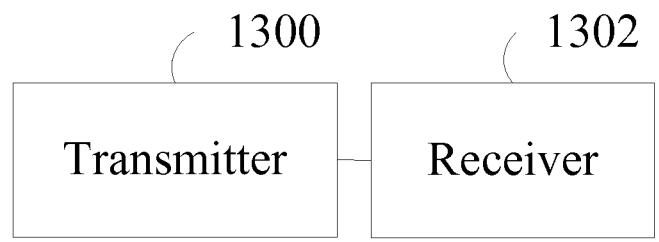
FIG. 13 is a structural view of another system for microwave signal error correction according to one embodiment of the present invention.

As shown in FIG. 13, another system for microwave signal error correction includes: a transmitter 1300 and a receiver 1302.

The transmitter 1300 is configured to transmit a first RF signal to a receiver 1302.

The receiver 1302 is configured to receive the first RF signal; sample the first RF signal to obtain the sampling data and obtain a feedback IQ signal from the sampling data; and transmit a second RF signal to the transmitter, the second RF signal carrying the feedback IQ signal.

The transmitter 1300 is further configured to receive the second RF signal and perform signal correction by using the feedback IQ signal.

The transmitter transmits the first RF signal to the receiver. The receiver receives the first RF signal. The first RF signal is sampled to obtain the sampling data, and then the feedback IQ signal is obtained from the sampling data. The receiver transmits the second RF signal to the transmitter, where the second RF signal carries the feedback IQ. The transmitter also receives the second RF signal and performs signal correction by using the feedback IQ signal. Sampling the received RF signal does not need an additional component. The receiving channel installed in the receiver can be used to receive the RF signal, which reduces the cost and power consumption. The feedback IQ signal is the signal processed by the receiving channel. In the error correction process of the transmitter, the error introduced by the receiving channel of the transmitter can be corrected.

Embodiment 16

Figure 14A:
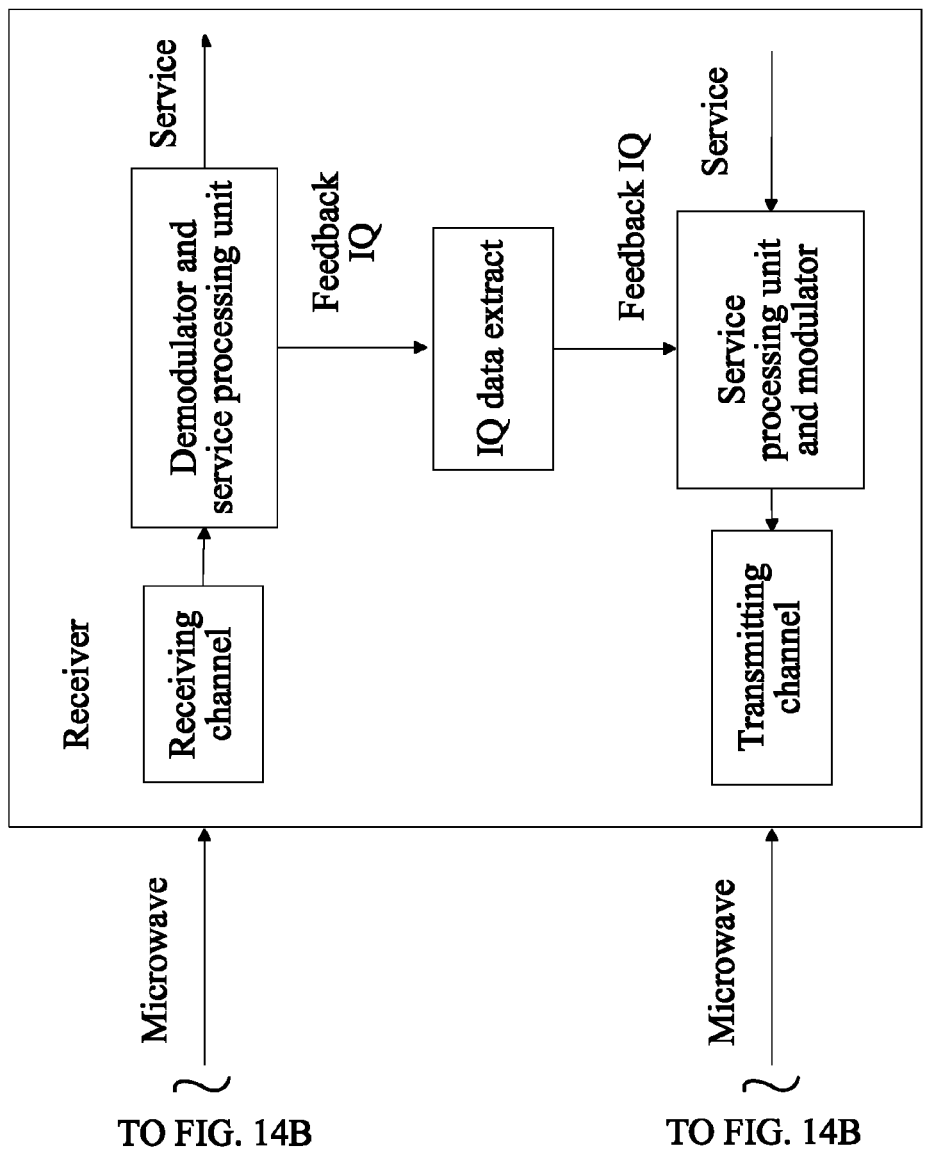
FIGS. 14A and 14B are a structural view of another system for microwave signal error correction according to one embodiment of the present invention.
Figure 14B:
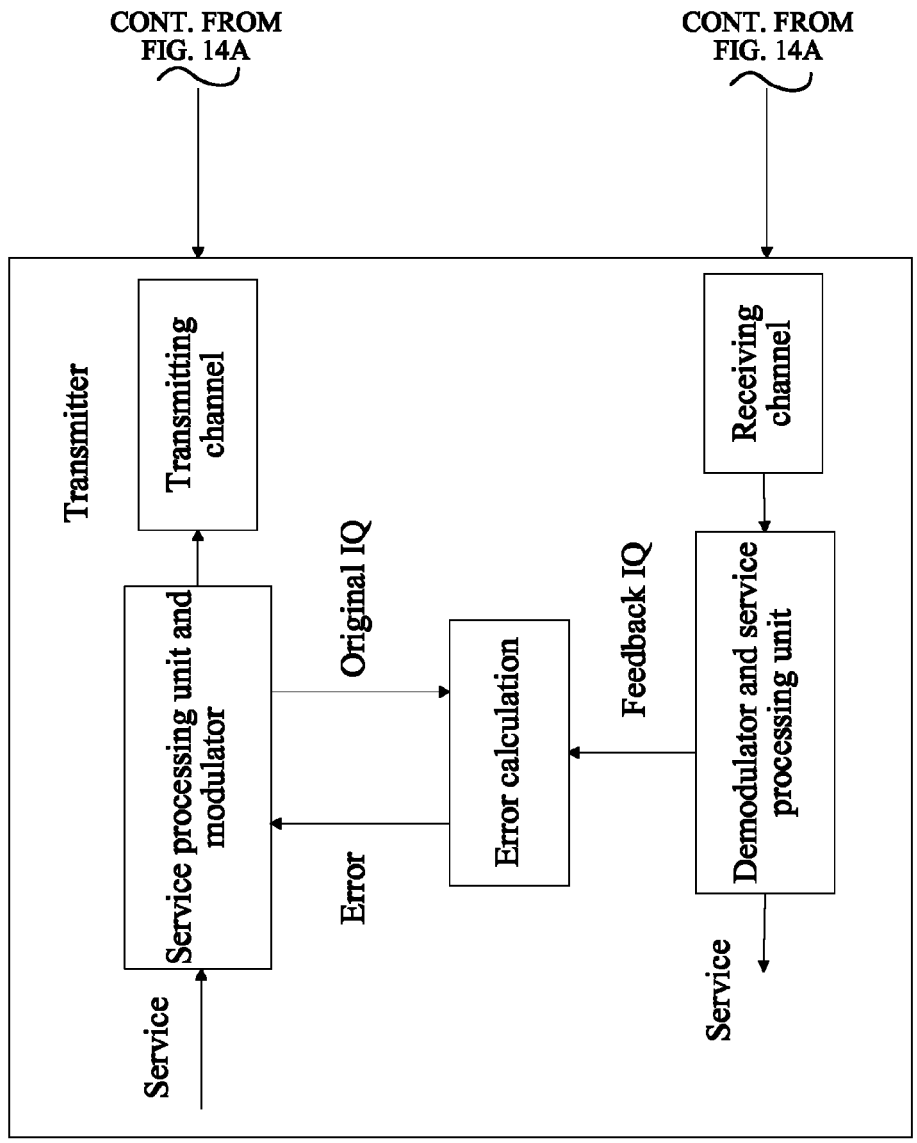

As shown in FIG. 14, another system for microwave signal error correction includes: a transmitter and a receiver.

The transmitter is configured to transmit a first RF signal to a receiver.

The original IQ signal generated by the service processing unit and modulator of the transmitter is divided into two original IQ signals. One original IQ signal is extracted to the local end. The other original IQ signal is directly transmitted to the receiver through the transmission channel.

The receiver is configured to receive the first RF signal; sample the first RF signal to obtain the sampling data and obtain a feedback IQ signal from the sampling data; and transmit a second RF signal to the transmitter, the second RF signal carrying the feedback IQ signal.

A Microwave frame of the second RF signal carries the feedback IQ signal. The feedback IQ signal can be extracted by the transmitter.

The transmitter is further configured to receive the second RF signal and perform signal correction by using the feedback IQ signal.

The transmitter extracts the feedback IQ signal, obtains the error signal through error calculation using the original IQ signal at the local end and the feedback IQ signal, and corrects the transmitted RF signal by using the error signal.

In this embodiment, the feedback IQ signal is transmitted to the transmitter. The transmitter obtains the error signal through error calculation by using the original IQ signal and feedback IQ signal and then corrects the transmitted RF signal by using the error signal. This improves the transmission performance of the transmitter and improves the receiving performance of the receiver.

Embodiment 17

Figure 15:
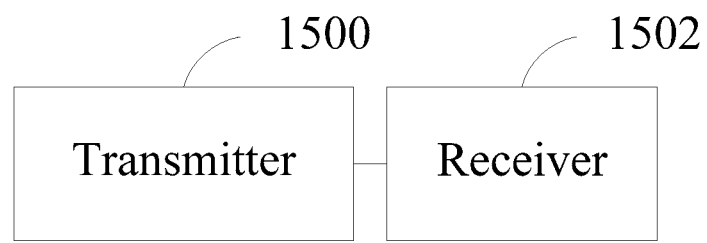
FIG. 15 is a structural view of another system for microwave signal error correction according to one embodiment of the present invention.

As shown in FIG. 15, another system for microwave signal error correction includes: a transmitter 1500 and a receiver 1502.

The transmitter 1500 is configured to transmit a first RF signal to the receiver 1502.

The receiver 1502 is configured to receive the first RF signal; sample the first RF signal to obtain the sampling data and obtain a feedback IQ signal from the sampling data; obtain an error signal through error calculation using the feedback IQ signal; and transmit a second RF signal to the transmitter 1500, the second RF signal carrying the error signal.

The transmitter 1500 is further configured to receive the second RF signal and correct the transmitted RF signal by using the error signal.

In this embodiment, the transmitter transmits the first RF signal to the receiver. The receiver receives the first RF signal. The first RF signal is sampled to obtain the sampling data, and then the feedback IQ signal is obtained from the sampling data. The receiver transmits the second RF signal to the transmitter, where the second RF signal carries the error signal. The transmitter also receives the second RF signal and performs signal correction by using the error signal. Sampling the received RF signal does not need an additional component. The receiving channel installed in the receiver can be used to receive the RF signal, which reduces the cost and power consumption. The feedback IQ signal is the signal processed by the receiving channel. In the error correction process of the transmitter, the error introduced by the receiving channel of the transmitter can be corrected.

Embodiment 18

Figure 16A:
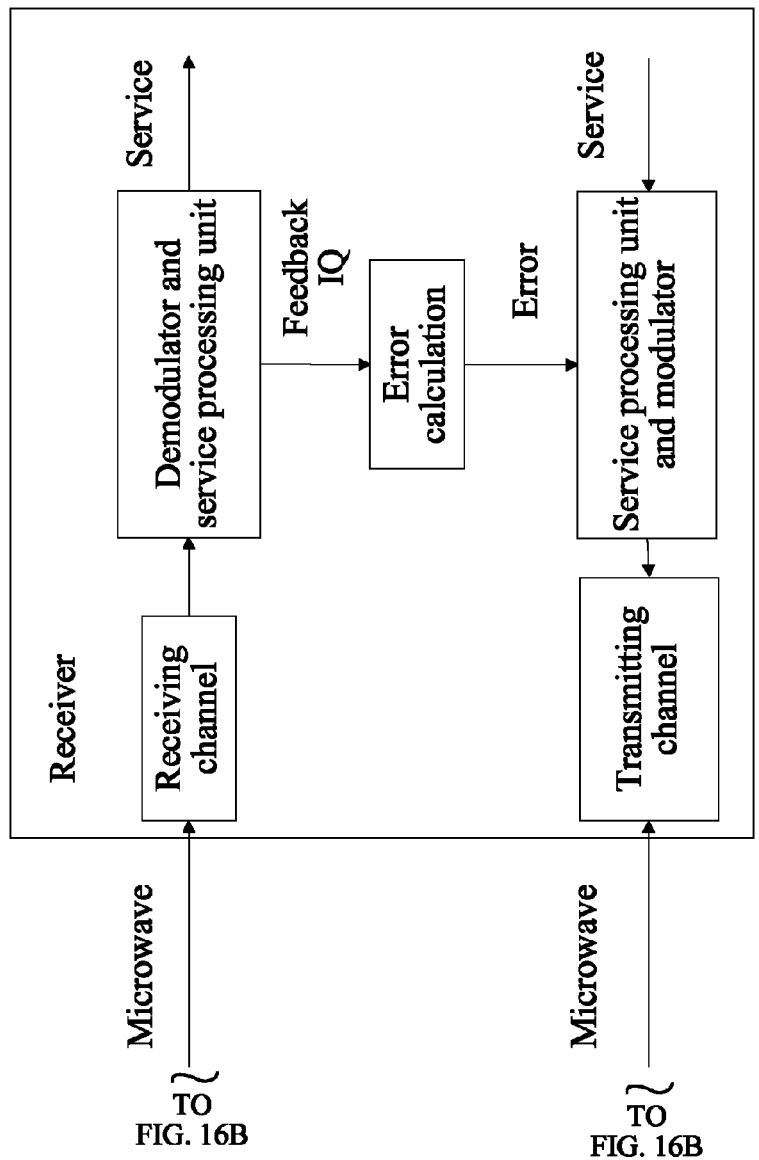
FIGS. 16A and 16B are a structural view of another system for microwave signal error correction according to one embodiment of the present invention.
Figure 16B:
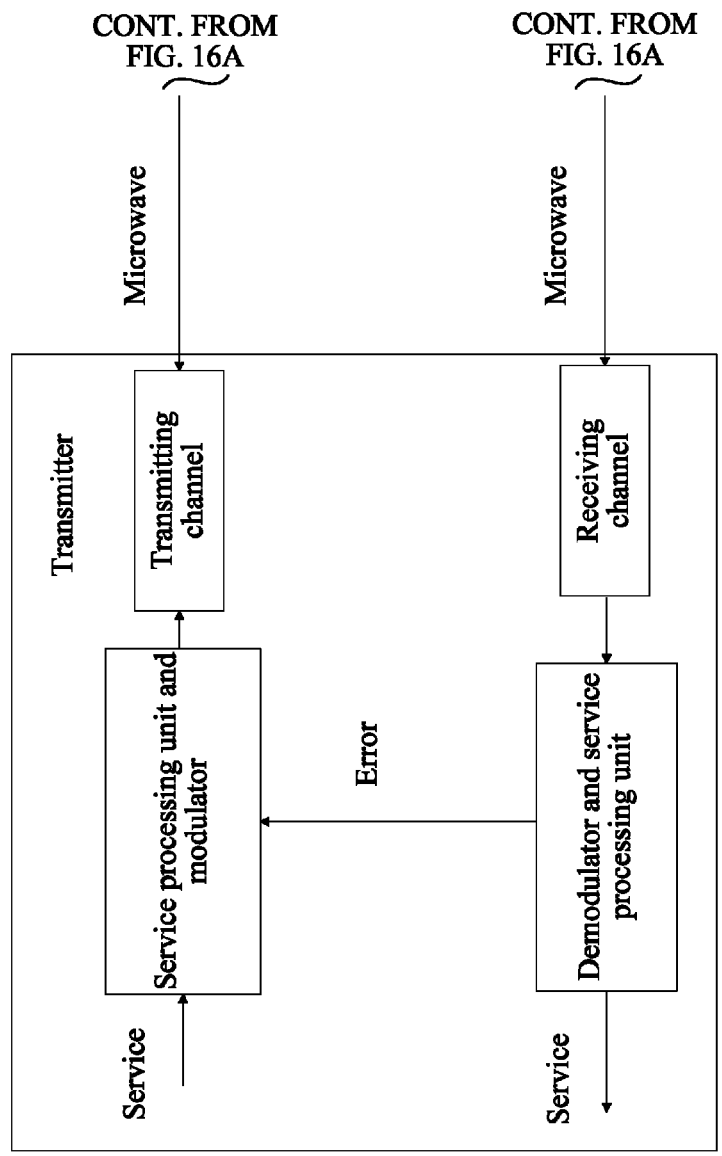

As shown in FIG. 16, another system for microwave signal error correction includes: a transmitter and a receiver.

The transmitter is configured to transmit a first RF signal to a receiver.

The service processing unit and modulator generate the original IQ signal. The original IQ signal is directly transmitted to the receiver through the transmission channel.

The receiver is configured to receive the first RF signal; sample the first RF signal to obtain the sampling data and obtain a feedback IQ signal from the sampling data; obtain an error signal through error calculation using the feedback IQ signal; and transmit a second RF signal to the transmitter, the second RF signal carrying the error signal.

The transmitter is further configured to receive the second RF signal and correct the transmitted RF signal by using the error signal.

In this embodiment, the error is calculated by using the feedback IQ signal directly. Therefore, the error correction effect weakens slightly. In such a case, the data size transmitted between the transmitter and receiver is small.

Through the preceding embodiments of the present invention, those skilled in the art can easily understood that the present invention can be implemented through software in combination with necessary hardware platform, and can also be implemented through the hardware. In most cases, the former is, however, is the better implementation mode. Based on such understandings, all or part of the technical solution under the present invention that makes contributions to the prior art can be essentially embodied in the form of a software product. The software product can be stored in a storage medium. The software product is stored in readable computer media, such as computer floppy disk, hard disk, and compact disk, and includes a number of instructions that enable a network device to execute the methods provided in the embodiments of the present invention.

Various embodiments described in the present invention are only exemplary embodiments, which are not intended to limit the protection scope of the invention. Any equivalent replacement, variation, and modification made according to the principle and spirit of the present invention shall be definitely covered by the protection of the present invention. Therefore, the protection scope of the present invention is defined by the appended claims.

What is claimed is:

1. A method for microwave signal correction performed by a receiver, comprising:
    receiving, by the receiver that is a peer device of a transmitter, a first radio frequency (RF) signal from the transmitter;
    sampling, by the receiver, the first RF signal to obtain sampling data, and obtaining a feedback IQ signal from the sampling data; and
    transmitting, by the receiver, a second RF signal that carries the feedback IQ signal to the transmitter, wherein the feedback IQ signal is used by the transmitter to correct a RF signal transmitted by the transmitter.

2. The method according to claim 1, wherein the transmitter correcting the RF signal transmitted by the transmitter comprises:
    obtaining, by the transmitter, an error signal through an error calculation using an original IQ signal and the feedback IQ signal; and
    correcting, by the transmitter, the RF signal transmitted by the transmitter by using the error signal.

3. The method according to claim 2, wherein the error signal is used to correct at least one of the following errors introduced by the transmitting channel of the transmitter and the receiving channel of the receiver: an error of an imbalance of the amplitude and phase of an original IQ signal, a gain error on a channel or a non-linear error.

4. A receiver for microwave signal correction, comprising:
    a receiving unit configured to receive a first radio frequency (RF) signal from a transmitter, wherein the receiver is a peer device of the transmitter;
    an obtaining unit configured to sample the first RF signal to obtain sampling data, and obtain a feedback IQ signal from the sampling data; and
    a transmitting unit configured to transmit a second RF signal that carries the feedback IQ signal to the transmitter, wherein the second RF signal carries the feedback IQ signal is used by the transmitter to correct a RF signal transmitted by the transmitter.

5. A system for microwave signal correction, comprising:
    a transmitter configured to transmit a first radio frequency (RF) signal, wherein a microwave frame of the first RF carries an original IQ signal; and
    a receiver which is a peer device of the transmitter and is configured to:
    receive the first RF signal from the transmitter;
    sample the first RF signal to obtain sampling data and obtain a feedback IQ signal from the sampling data;
    demodulate the sampling data to restore the microwave frame and obtain the original IQ signal;
    obtain an error signal through an error calculation using the original IQ signal and the feedback IQ signal; and
    perform a signal correction by using the error signal.

6. The system according to claim 5, wherein the receiver is configured to transmit a second RF signal to the transmitter, wherein a microwave frame of the second RF signal carries the error signal,
    wherein the transmitter is configured to perform the signal correction by using the error signal.

7. The system according to claim 5, wherein the error signal is used to correct at least one of the following errors introduced by the transmitting channel of the transmitter and the receiving channel of the receiver: an error of an imbalance of the amplitude and phase of the original IQ signal, a gain error on a channel or a non-linear error.

8. A system for microwave signal correction, comprising:
a receiver configured to receive a first radio frequency (RF) signal; sample the first RF signal to obtain sampling data and obtain a feedback IQ signal from the sampling data; and transmit a second RF signal, wherein the second RF signal carries the feedback IQ signal; and
a transmitter configured to transmit the first RF signal to the receiver, receive the second RF signal from the receiver, and perform a signal correction by using the feedback IQ signal, wherein the receiver is a peer device of the transmitter.

9. The system according to claim 8, wherein
the transmitter is configured to obtain an error signal through an error calculation by using an original IQ signal and the feedback IQ signal and perform the signal correction by using the error signal.

10. The system according to claim 9, wherein the error signal is used to correct at least one of the following errors introduced by the transmitting channel of the transmitter and the receiving channel of the receiver: an error of an imbalance of the amplitude and phase of an original IQ signal, a gain error on a channel or a non-linear error.

11. A system for microwave signal correction, comprising:
a receiver configured to receive a first radio frequency (RF) signal; sample the RF signal to obtain sampling data and obtain a feedback IQ signal from the sampling data; obtain an error signal through an error calculation by using the feedback IQ signal; and transmit a second RF signal which carries the error signal; and
a transmitter configured to transmit the first RF signal to the receiver, receive the second RF signal from the receiver and correct the second RF signal by using the error signal, wherein the receiver is a peer device of the transmitter.

12. The system according to claim 11, wherein
the receiver is configured to obtain the error signal through the error calculation by using the feedback IQ signal based on a time domain equalization.

13. The system according to claim 11, wherein the error signal is used to correct at least one of the following errors introduced by the transmitting channel of the transmitter and the receiving channel of the receiver: an error of an imbalance of the amplitude and phase of an original IQ signal, a gain error on a channel or a non-linear error.

* * * * *